(12) United States Patent
Strelbisky et al.

(10) Patent No.: US 12,460,274 B1
(45) Date of Patent: Nov. 4, 2025

(54) METHOD AND SYSTEM FOR INJECTING ADDITIONAL MATERIALS INTO A STEELMAKING VESSEL

(71) Applicant: Tallman Technologies Inc., Burlington (CA)

(72) Inventors: Michael J. Strelbisky, Burlington (CA); Aaron Michael Conrad Strelbisky, Burlington (CA); Majid Zamani, Burlington (CA)

(73) Assignee: TALLMAN TECHNOLOGIES INC., Burlington (CA)

( * ) Notice: Subject to any disclaimer, the term of this patent is extended or adjusted under 35 U.S.C. 154(b) by 368 days.

(21) Appl. No.: 18/312,205

(22) Filed: May 4, 2023

Related U.S. Application Data (60) Provisional application No. 63/340,665, filed on May 11, 2022.

(51) Int. Cl.
*C21C 5/52* (2006.01)

(52) U.S. Cl.
CPC ............ *C21C 5/5205* (2013.01); *C21C 5/527* (2013.01)

(58) Field of Classification Search
None
See application file for complete search history.

(56) References Cited

U.S. PATENT DOCUMENTS 7,641,849 B2   1/2010   Strelbisky et al.

OTHER PUBLICATIONS

Quick Reference Card—Burnjector for Electric Arc Furnace Steelmaking, Global Technical Solutions, Apr. 24, 2003.
Batham, Burnjector—Optimised Energy Injection for the Electric Arc Furnace, Feb. 2002.
Wolfe, et al., Lime Injection Technology—A Viable Tool for the Electric Arc Furnace, Carmeuse Lime & Stone, 2008.
Batham, Value Summary for Burnjector, Jul. 2004.

*Primary Examiner* — Anthony M Liang
(74) *Attorney, Agent, or Firm* — Gowling WLG (Canada) LLP (57) ABSTRACT

A method of injecting selected material along a preselected path into charged material. The charged material at least partially obstructs the preselected path. An injection device includes a central barrel through which a carrier stream of a transport gas is directed, and the selected material is introduced into the carrier stream to form a transport stream that exits the central barrel at an output end. The injection device also includes an outer barrel coaxial with the central barrel to define an annular space. An annular shroud stream of a shroud gas exits the annular space at a downstream end. The annular shroud is directed along the preselected path to provide an opening in the scrap steel pieces. Subsequently, the transport stream and the annular shroud stream are directed along the predetermined path to inject the selected material through the opening into the charged material.

1 Claim, 5 Drawing Sheets

METHOD AND SYSTEM FOR INJECTING ADDITIONAL MATERIALS INTO A STEELMAKING VESSEL

CROSS-REFERENCE TO RELATED APPLICATION

This application claims the benefit of U.S. Provisional Patent Application No. 63/340,665, filed on May 11, 2022, the entirety of which is hereby incorporated herein by reference.

FIELD OF THE INVENTION

The present invention is a method of injecting additional material along a preselected path into charged material positioned in a chamber inside a steelmaking vessel at a predetermined target location in the charged material.

BACKGROUND OF THE INVENTION

As is well known in the art, scrap steel typically is a major portion of the charged material added into an electric arc furnace to begin the batch process of making steel. In the process, the scrap steel is heated, and ultimately all of the steel inside the steelmaking vessel is molten. Accordingly, it is desirable to promote rapid scrap meltdown and otherwise to advance the steelmaking process, to minimize the tap-to-tap time.

As is also well known in the art, oxygen is injected into the steelmaking vessel during the steelmaking process, and lime or other solid particles of additional materials are added to the charged material, to assist in the formation of slag. In order to minimize tap-to-tap time, it is desirable that the steelmaking process advances quickly. For instance, the lime should be added at a target location in the charged material where it is needed, as quickly as possible, in order to promote the formation of slag.

However, as a practical matter, until the scrap steel and/or other charged material has melted, the charged material (including the scrap steel in it, if any) can interfere with the injection of the lime or other additional materials, simply by physically blocking the delivery of the lime or other additional materials directly to the target location, thereby delaying the progress of the steelmaking process.

SUMMARY OF THE INVENTION

For the foregoing reasons, there is a need for a method and system for injecting lime into charged material in a steelmaking vessel that mitigates or overcomes the defects and disadvantages of the prior art.

In its broad aspect, the invention provides a method of injecting a selected material along a preselected path into charged material positioned in a chamber inside a steelmaking vessel at a predetermined target location in the material. The charge material may include a plurality of scrap steel pieces that at least partially obstruct the preselected path. The method includes providing an injection device for injecting the lime.

The injection device includes a central barrel, through which a carrier stream of one or more transport gases is directed. The selected material is introduced into the carrier stream to form a transport stream. The transport stream exits the central barrel at an output end thereof.

The injection device also includes an outer barrel coaxial with the central barrel. The outer barrel is positioned to define an annular space between the outer barrel and the central barrel, through which an annular shroud stream of at least one shroud gas is directed to exit from the annular space at a downstream end thereof.

With the injection device, at a first selected time, the annular shroud stream is directed along the preselected path for a predetermined time period, to provide one or more openings in the scrap steel pieces that at least partially obstruct the preselected path.

With the injection device, at a second selected time subsequent to the first preselected time, the transport stream carrying the selected material therein is directed through the central barrel, and the annular shroud stream is directed through the annular space. Upon the annular shroud stream and the transport stream exiting the injection device at the downstream end and at the output end respectively, the annular shroud stream is concentric relative to the transport stream, and the annular shroud stream shrouds the transport stream to deliver the selected material through the one or more openings to the predetermined location via the preselected path.

The method and system of the invention enables solid particles of lime or other additional selected materials (e.g., carbon) needed for steelmaking to be injected relatively early in the steelmaking process, i.e., earlier than is feasible in the prior art.

BRIEF DESCRIPTION OF THE DRAWINGS

The invention will be better understood with reference to the attached drawings, in which.

DETAILED DESCRIPTION

In the attached drawings, like reference numerals designate corresponding elements throughout. Reference is made to FIGS. 1A-2B to describe an embodiment of a method in accordance with the invention.

In the following description, for convenience, reference is made to injecting "lime". For the purposes hereof, it will be understood that the method and system of the invention may be used to inject any of the additional selected materials (e.g., lime, dolomitic lime, carbon, and other additional materials) that may be injected into the charge during steelmaking. Accordingly, a reference to "lime" herein shall be understood as applying equally to any of the additional selected materials. A reference to a "selected" material should be understood as referring to lime or any one or more of the additional materials that may be added into a steelmaking vessel during steelmaking.

Figure 1C:
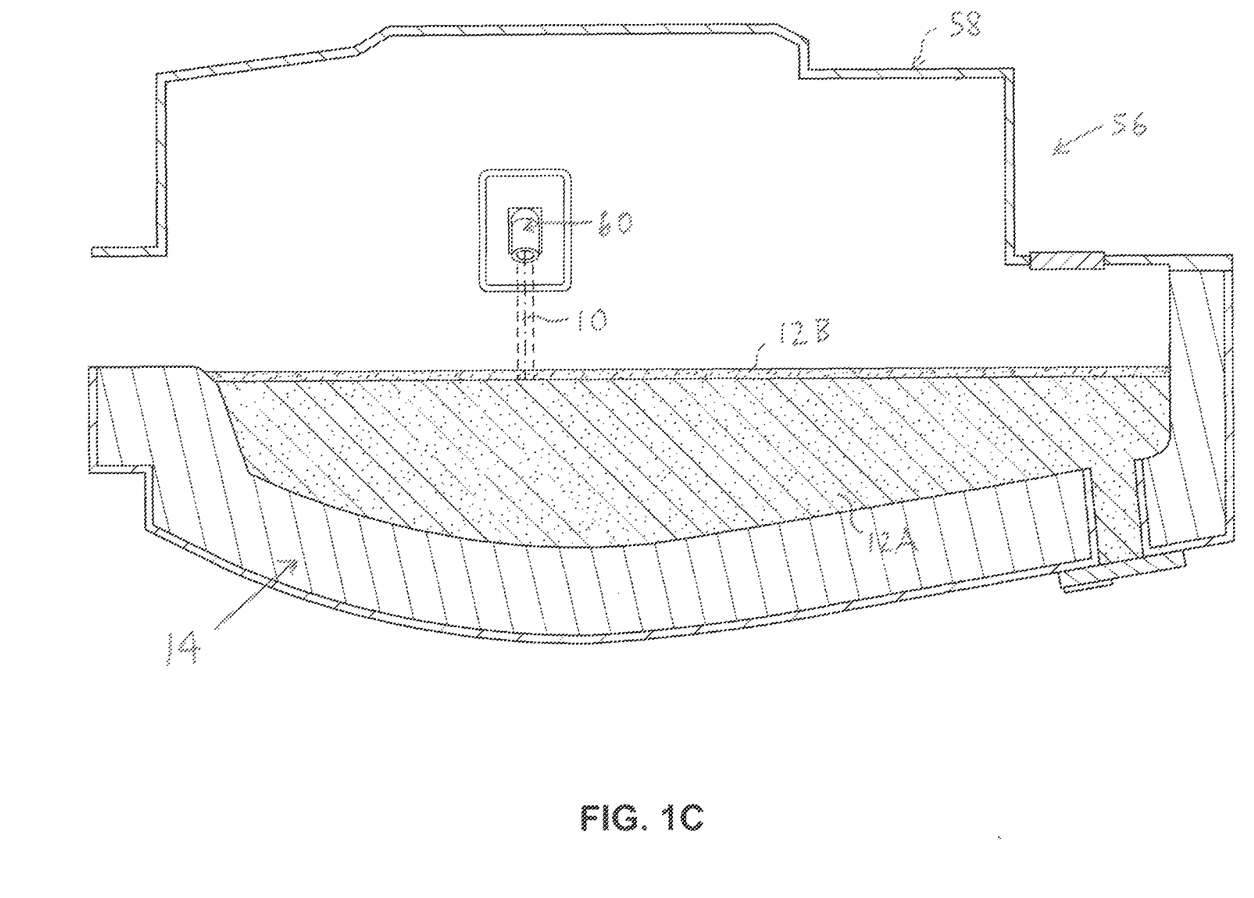
FIG. 1C is a cross-section of an electric arc furnace with molten steel and slag therein and the injection device of FIGS. 1A and 1B mounted on a side wall of the furnace, drawn at a smaller scale.
Figure 2A:
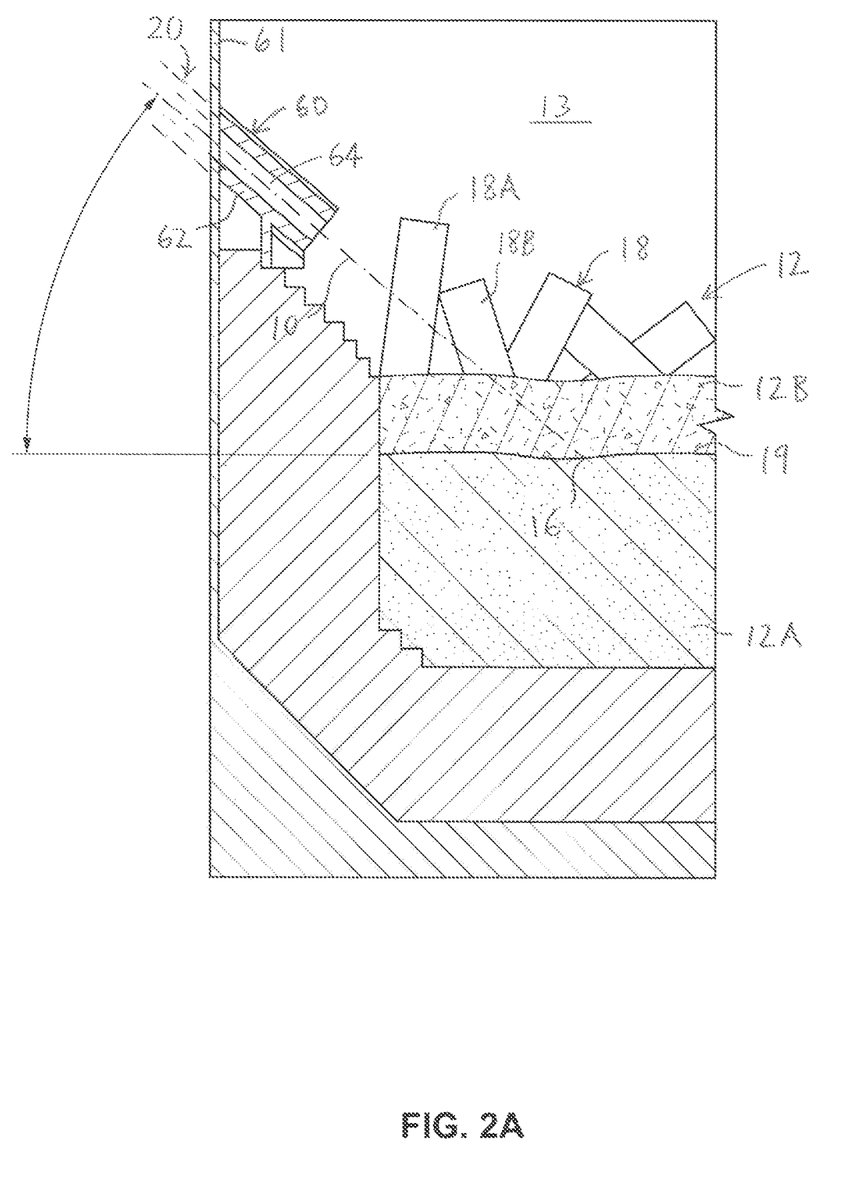
FIG. 2A is a cross-section of a portion of the electric arc furnace of FIG. 1C showing the injection device relative to a steel bath and a slag layer in the electric arc furnace showing scrap steel pieces obstructing a preselected path from the injection device, drawn at a larger scale.
Figure 2B:
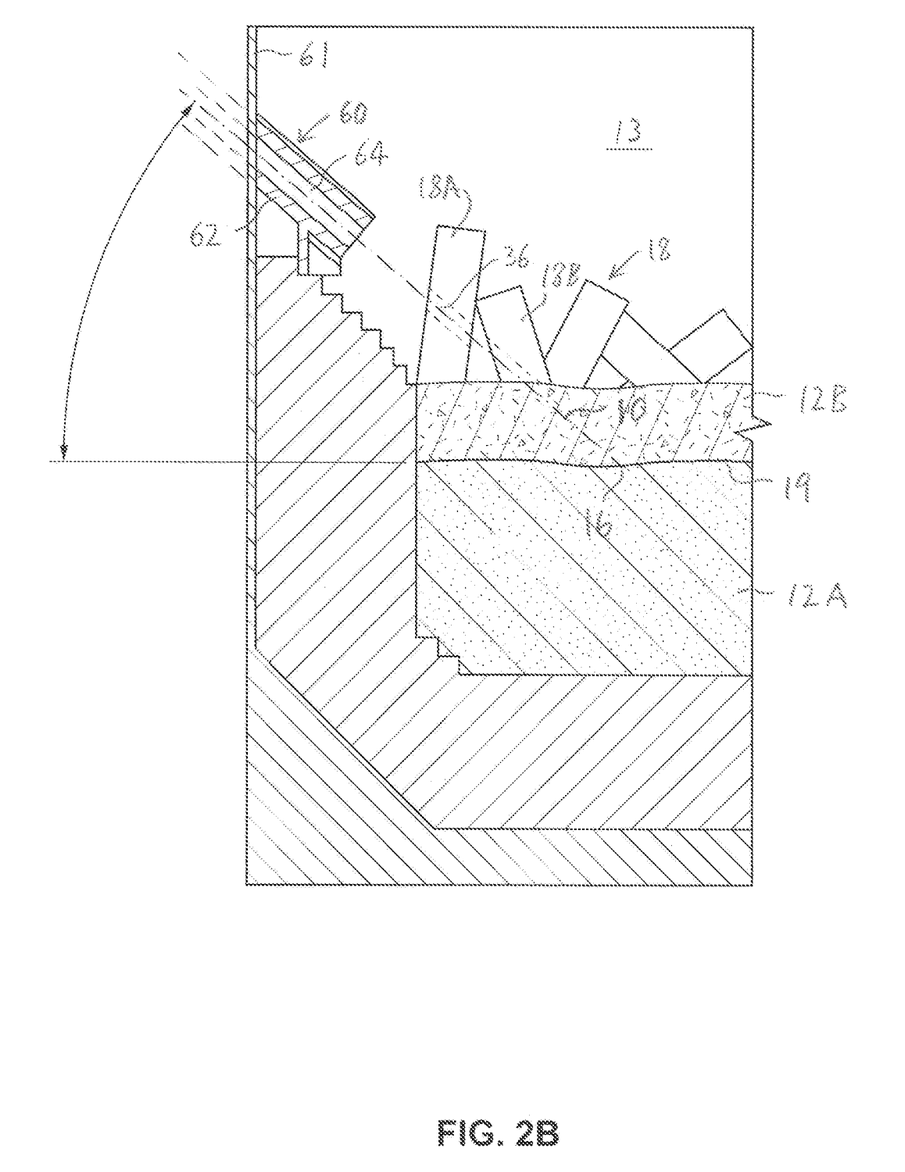
FIG. 2B is a cross-section of the portion of the electric arc furnace of FIG. 2A in which an opening has been formed in the scrap steel pieces.

As will be described, the method is for injecting the selected material (e.g., lime) along a preselected path 10 into charged material (i.e., the charge) 12 positioned in a chamber 13 inside a steelmaking vessel 14 (FIG. 1C) at a predetermined target location 16 in the charged material 12 (FIGS. 2A, 2B). As can be seen in FIG. 2B, the charged material 12 may include a number of scrap steel pieces 18 that at least partially obstruct the preselected path 10, as will also be described. However, the charged material may not include scrap steel pieces.

As is well known in the art, the steelmaking process may commence after the charged material 12 is initially positioned in the chamber 13. At an early stage of the steelmaking process, the material 12 may include molten steel 12A and slag 12B, as well as the scrap steel pieces 18 and other charged materials (FIGS. 2A, 2B). A slag-steel interface 19 is defined between the slag 12B and the molten steel 12A. In order to promote the formation of slag and thereby advance the steelmaking process, it is desirable to deliver the lime (and/or any other selected material) to the predetermined target location 16 at the slag-steel interface 19 as early in the process as is feasible.

Those skilled in the art would appreciate that the scrap steel pieces 18 are melted during the steelmaking process. However, as illustrated in FIGS. 2A and 2B, there may be a time period early in the process when one or more of the solid scrap steel pieces 18 are not melted, or only partially melted, when the scrap steel pieces 18 may be positioned to obstruct the flow of the lime to the predetermined location 16.

Figure 1A:
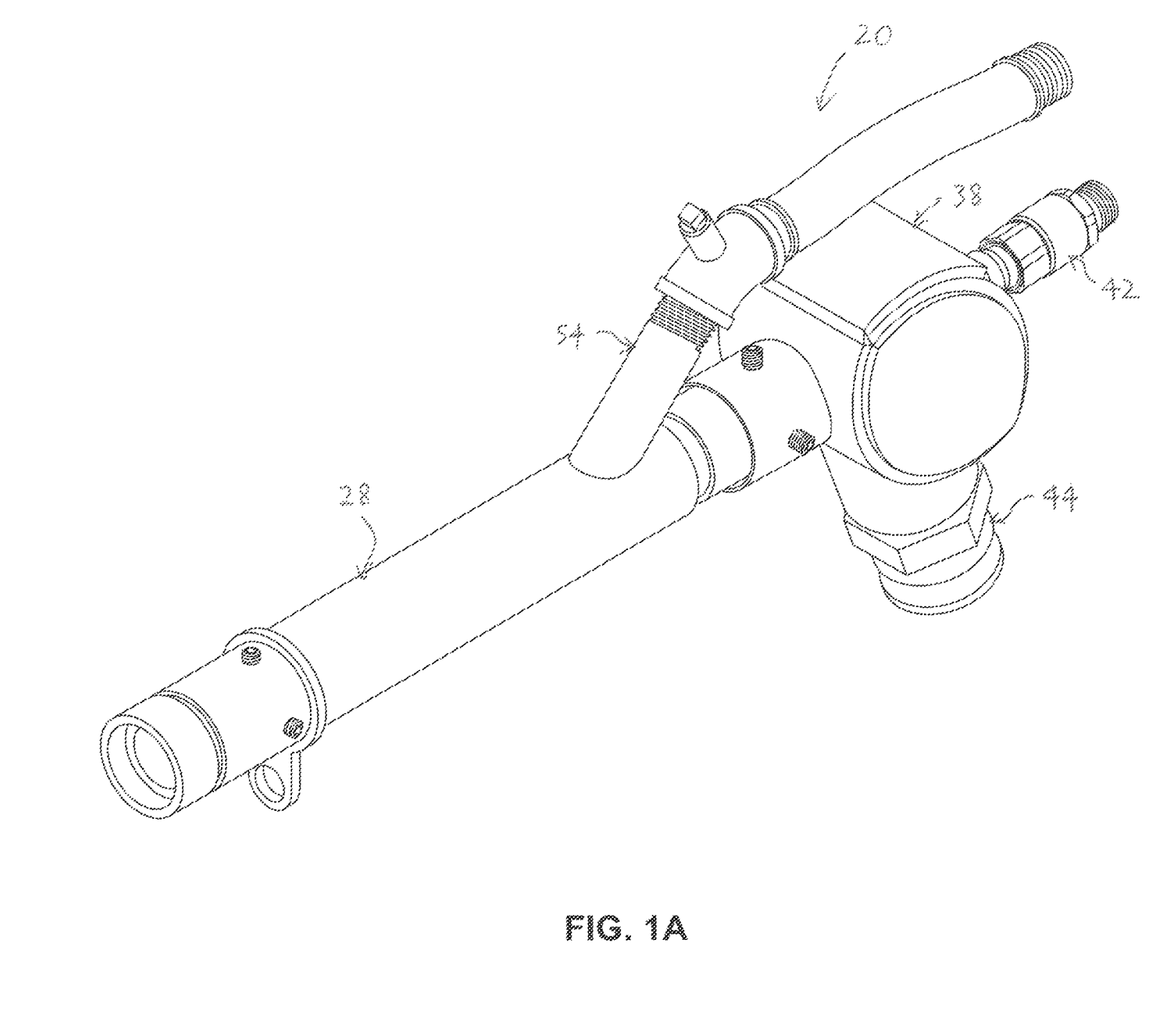
FIG. 1A is an isometric view of an embodiment of an injection device of the invention.
Figure 1B:
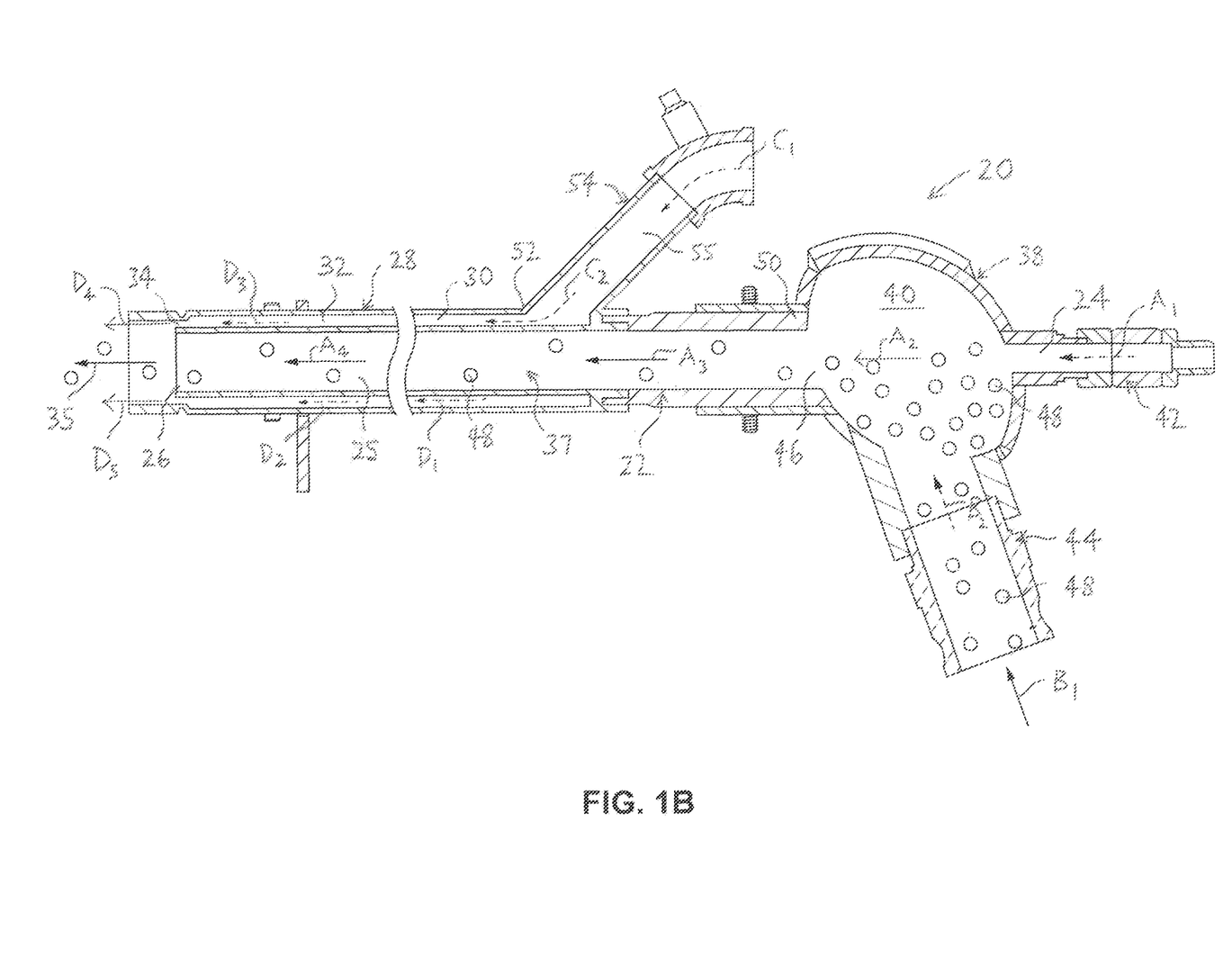
FIG. 1B is a longitudinal cross-section of the injection device of FIG. 1A.

In one embodiment, the method preferably includes providing an injection device 20 for injecting the lime (FIGS. 1A-1B). As can be seen in FIG. 1B, the injection device 20 preferably includes a central barrel 22, through which a carrier stream 24 of one or more transport gases may be directed. As will be described, the lime may be introduced into the carrier stream 24 in the injection device 20, and the carrier stream 24 carries the lime therein, to exit the central barrel 22 at an output end 26 thereof (FIG. 1B). For the purposes hereof, the carrier stream 24 with the lime and/or other selected material carried therein is collectively referred to as a transport stream 25.

Those skilled in the art would appreciate that, depending on the circumstances, it may be desirable to inject selected materials other than lime, or in addition to lime, into the steel bath 12A and/or the slag 12B. It will be understood that other materials may be injected into the steelmaking vessel in generally the same manner as the lime.

As can be seen in FIGS. 1A and 1B, the injection device 20 preferably includes an outer barrel 28 coaxial with the central barrel 22. Preferably, the outer barrel 28 is positioned to define an annular space 30 between the outer barrel 28 and the central barrel 22, through which an annular shroud stream 32 of one or more shroud gases is directed to exit from the annular space 30 at a downstream end 34 thereof.

The carrier stream 24 and the annular shroud stream 32 may include any suitable gas or gases, and may include different gases. Those skilled in the art would be aware of suitable gases. In one embodiment, it is preferred that the carrier stream 24 and the annular shroud stream 32 are oxygen, as will be described.

Those skilled in the art would appreciate that the transport stream 25 and the annular shroud stream 32 may move at any suitable velocity, or velocities. For example, the annular shroud stream 32 may be moving at a supersonic velocity when the annular shroud stream 32 exits from the downstream end 34. To achieve the supersonic velocity, the injection device 20 may include a Laval nozzle (not shown) in the annular space 30 at the downstream end 34. This arrangement is illustrated in U.S. Pat. No. 7,641,849, the entirety of which is hereby incorporated herein by reference.

From the foregoing, it can be seen that, immediately upon the transport stream 25 and the annular shroud stream 32 exiting from the injection device 20, the annular shroud stream 32 forms a stream of gas or gases that is concentric with the transport stream 25, thereby at least partially causing the transport stream 25 to be directed upon exit in a uniform exit direction (FIG. 1B). Preferably, the annular shroud stream 32 exits the annular space 30 at a supersonic velocity. The exit direction of both the annular shroud stream 32 and the transport stream 25 is indicated in FIG. 1B by arrow 35. As will be described, the injection device 20 preferably is positioned relative to the steelmaking vessel 14 to align the exit direction with the preselected path 10.

As noted above, in practice, at an early stage of the steelmaking process, one or more scrap steel pieces 18 may obstruct or partially obstruct the preselected path, i.e., before the scrap steel pieces 18 have melted. However, charged material that does not include scrap steel pieces may obstruct, or partially obstruct, the preselected path.

In practice, in order to begin forming an opening along the preselected path, a burner may be utilized.

In one embodiment, it is preferred that the annular shroud stream 32 is first directed out of the injection device 20 alone, i.e., in the absence of the transport stream 25. Preferably, the injection device 20 is controlled to direct only the annular shroud stream 32 therefrom, i.e., exiting at the downstream end 34 and directed along the preselected path 10. This may be done as a preliminary step, to form an opening, or to further form the opening, i.e., to clear the preselected path. (As noted above, this step may be preceded by utilizing a burner to start forming the opening.) It is preferred that the velocity at which the annular shroud stream 32 exits the downstream end 34 is controllable, so that the annular shroud stream 32 may exit at the downstream end: (i) at a velocity less than a supersonic velocity, or (ii) at a supersonic velocity.

For instance, at an early stage of the steelmaking process, there may be scrap steel pieces 18 in the charged material that are positioned to deflect the annular shroud stream 32 toward the furnace's wall initially. To minimize the consequences of such deflection, the annular shroud stream 32 may be directed along the preselected path at a subsonic velocity, for a limited time period. The operator may make decisions about whether to direct the annular shroud stream into the furnace at a subsonic velocity, and for how long, based on direct and indirect information about the steelmaking process.

For example, direct information may be available to the operator, e.g., via a camera system or offgas analysis. Alternatively, or in addition, the operator may be provided with indirect information (e.g., cumulative energy input into the steelmaking process to that point, and/or arc stability, and/or panel temperature) to enable the operator to assess the status of the steelmaking process.

For instance, at a very early stage of the steelmaking process, when the scrap steel may only have started to melt, the operator may choose to cause the annular shroud stream 32 to exit the downstream end 34 at a subsonic velocity, due to the possibility of deflection of the annular shroud stream 32 toward the furnace wall at that point.

Once the steelmaking process has advanced further, the scrap steel pieces are easier to cut through, and at that time the operator may allow the annular shroud stream 32 to exit the downstream end 34 at a supersonic velocity, in order to cut through any scrap steel pieces then obstructing the preselected path.

Alternatively, depending on the information directly and/or indirectly available concerning the status of the steelmaking process, the operator may begin by causing the annular shroud stream 32 to exit the downstream end 34 at a supersonic velocity. That is, the operator may choose not to direct the annular shroud stream out of the downstream end at a subsonic velocity.

From the foregoing, it can be seen that the annular shroud stream 32 preferably is directed from the downstream end 34 alone at a first selected time. As noted above, the annular shroud stream is directed out of the downstream end alone so that the annular shroud stream 32 may, over a relatively short time period, cut through obstacles in its path, i.e., anything at least partially obstructing the preselected path 10. Also, at the first selected time, the annular shroud stream 32, alone, may be directed into the furnace at a subsonic velocity. Preferably, after this has continued for a limited time period, the velocity is increased, i.e., the annular shroud stream 32 is then directed into the furnace at a supersonic velocity, to clear the preselected path. Alternatively, at the first selected time, the annular shroud stream 32 may be directed into the furnace at a supersonic velocity, to clear the preselected path.

From the foregoing, it can be seen that the injection device 20 may direct the annular shroud stream 32 alone in the exit direction, which is aligned with the preselected path 10, in order to ensure that the preselected path 10 is unobstructed. This begins at the first selected time.

Subsequently, once the preselected path is unobstructed, the transport stream 25, i.e., the carrier stream 24 carrying lime, may also be directed from the injection device 20 in the exit direction, i.e., along the preselected path 10, to the predetermined target location 16. Preferably, at this time (hereinafter sometimes referred to as a second selected time), the transport stream 25 and the annular shroud stream 32 exit the injection device simultaneously, and the annular shroud stream 32 (preferably, at a supersonic velocity) shrouds the transport stream 25, guiding the transport stream 25 along the preselected path 10. In this way, the lime is ultimately delivered to the predetermined target location 16.

The transport stream 25 is introduced subsequently, at the second selected time.

An example is illustrated in FIG. 2A. In the circumstances illustrated in FIG. 2A, the scrap steel pieces 18 have not yet melted (or have only partially melted), and certain of the scrap steel pieces 18 obstruct the preselected path 10 from the injection device 20 to the predetermined target location 16, at which the lime is to be delivered. For convenience, two scrap steel pieces that are obstructing the preselected path 10 are identified in FIG. 2A by reference characters 18A and 18B.

With the injection device 20, at a first selected time, the annular shroud stream 32 is directed along the preselected path 10 for a predetermined time period, to provide at least one opening 36 in the scrap steel pieces 18 that at least partially obstruct the preselected path 10, if any. At this point, there is no transport stream 25 exiting from the injection device 20.

Those skilled in the art would also appreciate that the first selected time, when the annular shroud stream 32 alone is directed along the preselected path 10, preferably is at a time early in a heat, when it can be anticipated that scrap steel pieces 18 that have not yet melted may obstruct the preselected path 10. As a practical matter, however, an operator may choose to direct the annular shroud stream 32 alone into the chamber 13 of the steelmaking vessel 14 at any suitable time or times in the heat, depending on the circumstances, if scrap steel pieces 18 not yet melted at that point in the process appear to obstruct the preselected path 10.

Ideally, after the preselected path 10 has been cleared, the lime is delivered to the predetermined target location 16 by the transport stream 25 exiting from the injection device 20 along the preselected path 10 while the transport stream 25 is shrouded by the annular shroud stream 32, as illustrated in FIG. 2B. The point at which this happens, i.e., when the operator considers that the preselected path 10 is unobstructed, is referred to herein as the second selected time. It is also preferred that, with the injection device 20, at the second selected time, the transport stream 25 carrying the lime is directed through a bore 37 of the central barrel 22, and the annular shroud stream 32 is directed through the annular space 30 at the same time, to exit the downstream end 34 at a supersonic velocity.

Accordingly, upon the annular shroud stream 32 and the transport stream 24 exiting the injection device 20 at the downstream end 34 and at the output end 26 respectively, the annular shroud stream 32 shrouds the transport stream 24 for delivery of the lime to the predetermined location 16 via the preselected path 10.

Those skilled in the art would appreciate that, during steelmaking, the operator may be unable to directly observe or assess the status of the steelmaking process inside the steelmaking vessel 14. As noted above, the operator first determines the first selected time, based on the available information, direct and/or indirect. The operator also determines, based on the available information, whether to initially direct the annular shroud stream 32 into the furnace at a subsonic velocity, or at a supersonic velocity.

If the annular shroud stream 32 alone is initially directed into the furnace at a subsonic velocity, then the operator subsequently determines when to increase the velocity of the annular shroud stream alone to a supersonic velocity. The first selected time may be at least in part based on previous experience, or other data that may provide a basis for estimating an optimum first selected time, as well as based on direct and indirect information, as described above. Similarly, the second selected time, at which the transport stream 24 carrying the lime therein is directed along the preselected path 10, may be based on the direct and indirect information or in part estimated or predicted based on previous experience.

As noted above, in one embodiment, the annular shroud stream 32 preferably includes oxygen. The introduction of oxygen inside the steelmaking vessel 14 assists in the formation of FeO, allows the lime to flux faster, and generates heat.

As also noted above, other additional materials in the form of particles (e.g., carbon) may be injected into the charge. Those skilled in the art would appreciate that such other additional materials may be added via other injection devices.

As can be seen in FIG. 1B, in one embodiment, the injection device 20 preferably includes a housing 38 which defines a cavity 40 therein. The carrier stream 24 is introduced into the cavity 40 via a carrier stream inlet 42 (FIG. 1B). The carrier stream 24 preferably is directed through the carrier stream inlet 42 and through the cavity 40 in the directions indicated by arrows "$A_1$" and "$A_2$" in FIG. 1B.

The injection device 20 preferably also includes a lime inlet pipe 44 that is in fluid communication with the cavity 40. The lime is drawn from the lime inlet pipe 44, in the direction indicated by arrows "$B_1$" and "$B_2$", into the carrier stream 24 as the carrier stream 24 moves through the cavity 40 to form the transport stream 25, which exits the cavity 40 at a downstream opening 46 of the housing 38. The transport stream 25 is formed in the cavity 40, when the lime is entrained in the carrier stream 24. The transport stream 25 includes the carrier stream 24 and the lime carried therein.

It will be understood that, in FIG. 1B, the lime is shown as relatively large particles 48, which are drawn at an exaggerated scale for clarity. Those skilled in the art would appreciate that the lime may be provided in relatively small particle sizes (e.g., less than 8 mm diameter).

As can be seen in FIG. 1B, the central barrel 22 extends between an input end 50 and the output end 26. At the input end 50, the bore 37 of the central barrel 22 is aligned with the downstream opening 46 of the housing 38.

The transport stream 25 is directed along the bore 37 from the input end 50 to the output end 26, as indicated by arrows "$A_3$" and "$A_4$". Upon exiting the bore 37 at the output end 26, the transport stream 25 is directed in the exit direction, indicated by arrow 35.

Preferably, the annular shroud stream 32 is introduced into the annular space 30 at an upstream end 52 of the outer barrel 28 via a shroud stream inlet pipe 54. The movement of a shroud stream 55 through the shroud stream inlet pipe 54 and into the annular space 30 at the upstream end 52 is indicated by arrows "$C_1$", "$C_2$". As can be seen in FIG. 1B, once the shroud stream 55 is directed into the annular space 30 at the upstream end 52, the shroud stream 55 is formed into the annular shroud stream 32, and the annular shroud stream 32 moves as indicated by arrows "$D_1$", "$D_2$", and "$D_3$" to form a concentric shroud of gas or gases surrounding the transport stream 25 moving in the exit direction. The direction of movement of the annular shroud stream 32 at the downstream end 34 is indicated by arrows "$D_4$" and "$D_5$" (FIG. 1B). The annular shroud stream 32 is also moving in the exit direction, indicated by arrow 35, upon exiting the annular space 30 at the downstream end 34.

As can be seen in FIG. 1C, the steelmaking vessel 14 may be a hearth included in an electric arc furnace 56. The electric arc furnace 56 may include an upper shell portion 58, in which the injection device 20 may be at least partially mounted (FIGS. 1C, 2A). It will be understood that many elements of the electric arc furnace 56 are omitted for clarity of illustration. As will be described, in practice, it is preferred that a nose assembly 60 is used with the injection device 20, in order to at least partially protect the output end 26 of the central barrel 22 and the downstream end 34 of the outer barrel 28 from the harsh environment inside the steelmaking vessel 14.

As can be seen in FIGS. 2A and 2B, the shell portion 58 includes a wall 61 in which the nose assembly 60 preferably is mounted. Those skilled in the art would appreciate that the nose assembly 60 may be made of any suitable materials. The nose assembly 60 preferably is made of cast copper and is water-cooled for durability. Preferably, the nose assembly 60 includes a body 62 with a hole 64 therethrough. The injection device 20 preferably is mounted to the nose assembly 60 so that the hole 64 is coaxial with the central barrel 22 and the outer barrel 28. It will be understood that the injection device 20 preferably is secured in position to align the bore 37 and the annular space 30 with the hole 64, so that the transport stream 25 and the annular shroud stream 32 are directed in the exit direction indicated by arrow 35 through the hole 64 to exit from the nose assembly 30 along the preselected path 10.

As described above, the annular shroud stream 32 alone may be directed out of the hole 64 and into the cavity 13 along the preselected path 10, to eliminate any portions of scrap steel pieces 18 that may be obstructing the preselected path 10. As described above, when it is believed that the preselected path 10 is unobstructed, the transport stream 25 may be directed through the bore 37 and into the hole 64, with the annular shroud stream 32, to deliver the lime to the predetermined target location 16.

Those skilled in the art would appreciate that, during steelmaking, molten steel or other materials may splash onto the nose assembly 60, tending to partially or fully obstruct the hole 64. When the injection device 20 is not injecting lime, the annular shroud stream 32 may be made of a gas or gases other than oxygen (e.g., air, or nitrogen) that is directed continuously through the annular space 30, at less than supersonic velocity, to cool the injection device 20 and to avoid clogging of the injection device 20.

From the foregoing, it can be seen that the method and system of the invention permits the additional material to be injected into the charge earlier in the steelmaking process than is typically feasible in the prior art. As noted above, earlier injection enables the steelmaking process to proceed more expeditiously, ultimately reducing tap-to-tap time.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of injecting a selected material along a preselected path into charged material positioned in a chamber inside a steelmaking vessel at a predetermined target location in the charged material, the charged material at least partially obstructing the preselected path, the method comprising:
    (a) providing an injection device for injecting the selected material, the injection device comprising:
        a central barrel, through which a carrier stream of at least one transport gas is directed, the selected material being introduced into the carrier stream to form a transport stream, the transport stream exiting the central barrel at an output end thereof;
        an outer barrel coaxial with the central barrel, the outer barrel being positioned to define an annular space between the outer barrel and the central barrel, through which an annular shroud stream of at least one shroud gas is directed to exit from the annular space at a downstream end thereof;
    (b) with the injection device, at a first selected time, directing the annular shroud stream along the preselected path for a predetermined time period, to provide at least one opening in the scrap steel pieces that at least partially obstruct the preselected path; and
    (c) with the injection device, at a second selected time, directing the transport stream carrying the selected material therein through the central barrel and directing the annular shroud stream through the annular space, wherein, upon the annular shroud stream and the transport stream exiting the injection device at the downstream end and at the output end respectively, the annular shroud stream is concentric relative to the transport stream, and the annular shroud stream shrouds the transport stream to deliver the selected material through said at least one opening to the predetermined location via the preselected path.

* * * * *